(12) United States Patent
Danilov et al.

(10) Patent No.: US 11,593,030 B2
(45) Date of Patent: Feb. 28, 2023

(54) CROSS-STREAM TRANSACTIONS IN A STREAMING DATA STORAGE SYSTEM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 2 days.

(21) Appl. No.: 17/316,842

(22) Filed: May 11, 2021

(65) Prior Publication Data
US 2022/0365713 A1 Nov. 17, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0613* (2013.01); *G06F 3/0635* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 8,260,949 B2* | 9/2012 | Karpoff | H04N 21/472 |
| | | | 725/86 |
| 10,095,613 B2* | 10/2018 | Jo | G06F 3/0679 |
| 2011/0113213 A1* | 5/2011 | Obr | G06F 9/30181 |
| | | | 711/E12.001 |
| 2013/0166766 A1* | 6/2013 | Nahrstedt | H04N 21/2393 |
| | | | 709/231 |
| 2014/0156913 A1* | 6/2014 | Chiang | G06F 3/0659 |
| | | | 711/103 |
| 2018/0332087 A1* | 11/2018 | Paduroiu | H04L 9/0643 |
| 2020/0228352 A1* | 7/2020 | Yang | H04L 9/321 |

* cited by examiner

*Primary Examiner* — Yaima Rigol
(74) *Attorney, Agent, or Firm* — Amin, Turocy & Watson, LLP

(57) ABSTRACT

The described technology is generally directed towards cross-stream transactions in a streaming data storage system, which allows a writer application to commit multiple events to distinct data streams in a single transaction. The system creates a cross-stream transaction for a writer application, and the writer application adds events to the cross-stream transaction, indicating which destination data stream(s) each event's data is to be appended. The system adds the event to a subordinate transaction created for each specified data stream. Upon committing the cross-stream transaction, the system coordinates the committing of the subordinate transactions to their respective data streams. Alternatively, an application writer can request that an event be committed to multiple writer-specified data streams via a cross-stream micro-transaction, in which the streaming data storage system obtains the appropriate segment store instances and segments for each data stream, and coordinates the direct appending of the event to the appropriate segments.

20 Claims, 13 Drawing Sheets

CROSS-STREAM TRANSACTIONS IN A STREAMING DATA STORAGE SYSTEM

BACKGROUND

Contemporary data storage systems store data in a storage abstraction referred to as a data stream, or more simply a stream. A stream is identified with a name, and can store continuous and potentially unbounded data; more particularly, a stream comprises a durable, elastic, append-only, sequence of stored events. New events are added to a tail (front) of a stream. One stream may be divided into one or more segments, with an event appended to a segment based on a routing key associated with the event that determines to which segment the event data is written.

One implementation of a streaming data storage system supports transactions, in which an event writer application can add multiple events to a transaction that is created for a data stream. Once the transaction contains the appropriate events, the writer requests the system to commit the transaction's events as a unit into the data stream. If instead the transaction is aborted, the transaction is removed from the system.

While a transaction can contain events that route to different segments, such a transaction is limited to the segments of a single data stream. However, a more advanced application (job) may write events to more than one data stream.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
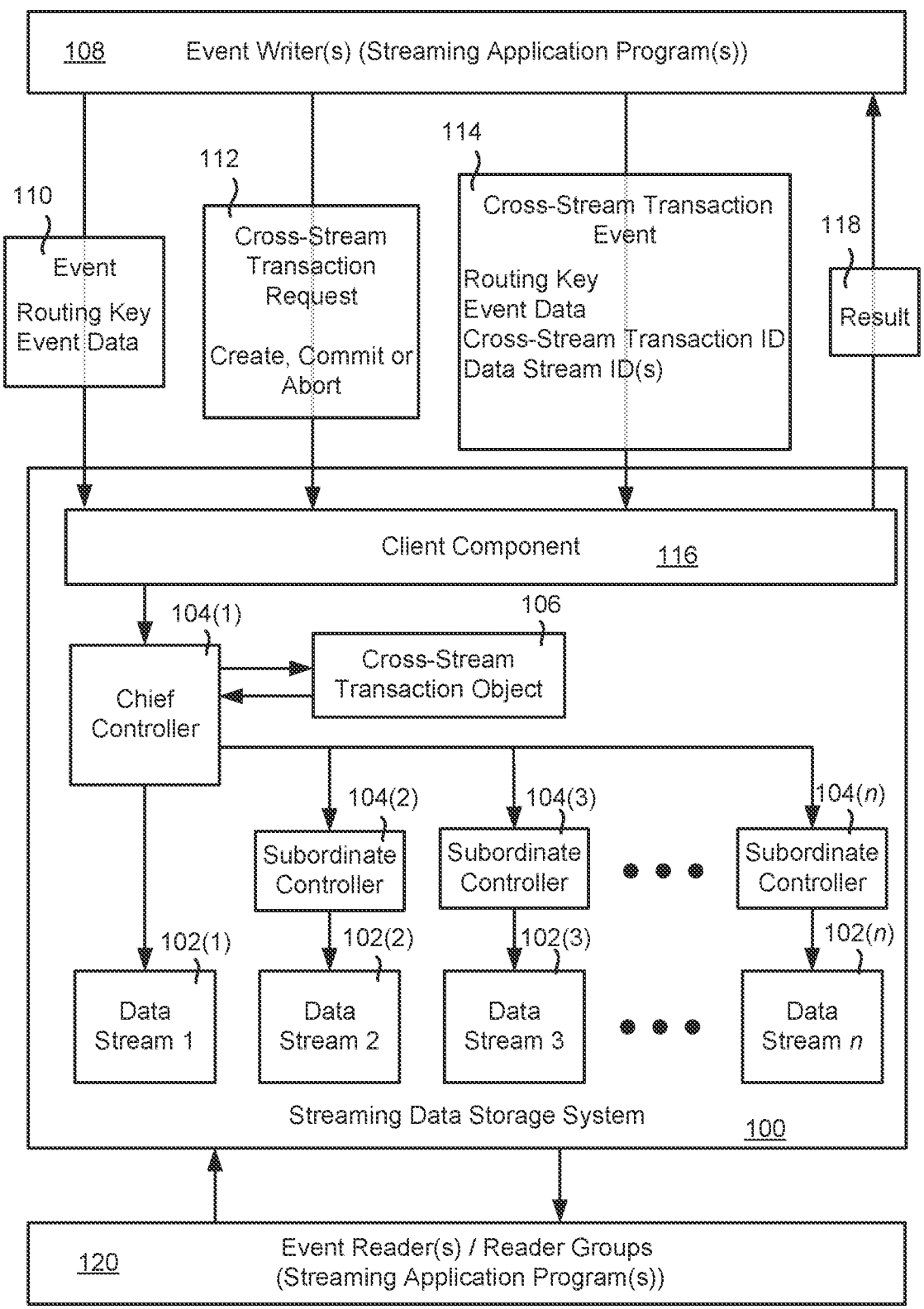
FIG. 1 is a block diagram representation of example components and data-related operations in a streaming data storage system that supports cross-stream transactions, in accordance with various aspects and implementations of the subject disclosure.

Various aspects of the technology described herein are generally directed towards a streaming data storage system/platform that supports cross-stream transactions, in which a cross-stream transaction allows a writer application to commit a single transaction comprising multiple events to two or more data streams. In one implementation, as will be understood the technology can coordinate such a cross-stream transaction using much of the already-existing streaming data storage system transaction synchronization technology.

In general, a streaming data storage system creates a cross-stream transaction upon a request of an event writer application. The event writer adds events to the cross-stream transaction, indicating which destination data stream (or multiple destination data streams) each event's data is to be appended. In one or more implementations, the streaming data storage system adds the event data to a subordinate transaction (created as needed and subordinate to the cross-stream transaction) on each such indicated data stream, leveraging the existing streaming data storage system ("normal" single data stream) transaction technology. When the writer requests that the streaming data storage system commit the cross-stream transaction, the streaming data storage system coordinates the automatic committing of the subordinate transactions to their respective data streams.

In an alternative aspect, a cross-stream transaction can be made more optimal for particular use cases, e.g., when an event is to be written and committed as a transaction to two or more streams at generally the same time. To this end, the technology described herein facilitates the use of cross-stream micro-transactions, in which a single event can be "multiplied" by appending to multiple writer-specified data streams. In general, an application writer requests that writer-supplied event data be committed to two or more writer-specified data streams via a cross-stream micro-transaction. The streaming data storage system obtains the relevant information (e.g., segment store instances and segments) from a controller instance of each data stream, and coordinates the appending of the event to the appropriate respective segments of the specified respective data streams.

It should be understood that any of the examples herein are non-limiting. For instance, virtually any stream-based data storage system may benefit from the technology described herein. As a more particular example, a controller, a client component and segment store instances are described as one way in which cross-stream transactions can be implemented, leveraging some of the already-existing transaction technology of one data stream storage system/platform. However, other data stream storage systems can use a similar concept, which may include similar already-existing transaction technology, or alternatively can be based on new or modified per-data stream transaction technologies. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 that includes a number of data streams 102(1)-102(n), with respective data streams 102(1)-102(n) having respective controllers (controller instances) 104(1)-104(n). As described herein, one of the controllers (e.g., the controller 104(1)) acts as a chief controller with respect to a cross-stream transaction, corresponding to a cross-stream transaction data structure (e.g., object) 106. The other controllers (e.g., the controllers 104(1)-104(n)) as described in this example act as subject controllers with respect to the cross-stream transaction. Note that a chief controller can also act as (e.g., at the same time or different times) a subordinate controller for a different cross-stream transaction. Further, note that not every data stream needs to be part of a cross stream transaction, e.g., in a streaming data storage system such as the system 100 there can be data streams 102(1)-102(x), where x is greater than n. Still further, as few as two data streams such as data stream 102(2) and 102(3) can be involved in a cross-stream transaction, and it is understood that the example of FIG. 1 is a non-limiting example.

In general, event writer application programs 108 write events to be appended to a data stream. These can involve conventional events such as the event 110 comprising a routing key and event data, as well as single stream (normal) transaction-related events (not explicitly shown in FIG. 1) to append as a transaction to a single data stream.

As described herein, the event writer application programs 108 can also request (block 112) creation of a cross-stream transaction, and thereafter add events (block 114) to the cross-stream transaction. As also represented via block 112, the event writer application programs 108 can request that a not-yet committed cross-stream transaction be committed or aborted.

In general, each communication of an event writer application program 108 with the streaming data storage system 100 is via a client component 116; each such communication can be responded to by the streaming data storage system 100, as represented via result (block (118). For example (assuming no error), a conventional event is responded to with an acknowledge (ACK) result once received by the system, as is an event directed to a cross-stream transaction. A cross-stream transaction creation request is responded to with a cross-stream transaction identifier (ID), e.g., corresponding to the cross-stream transaction data structure ID. A cross-stream transaction commit request is responded to with a status response, e.g., success or failure (or the like).

In general, events added to a transaction are durable once an event is acknowledged back to the writer. However, events in a transaction are not visible to readers/reader groups (block 120) until that transaction is successfully committed by the writer program 108.

As set forth above, a normal, conventional transaction is sufficient for basic stream processing applications. However, if an application writes to at least two different streams, the cross-stream technology described herein facilitates the operations that allow the writes to be committed together as a transaction. Note that instead of the cross-stream transaction technology described herein, possible solutions to transactionally append events to two or more streams, such as having two (or more) independent transactions, one transaction for each stream, would be complex and difficult to implement, as somehow the group of independent transactions would need to implement all-or-nothing behavior, assure that data appears in the group of streams at more or less the same time, and handle failures without producing events' duplicates.

Figure 2:
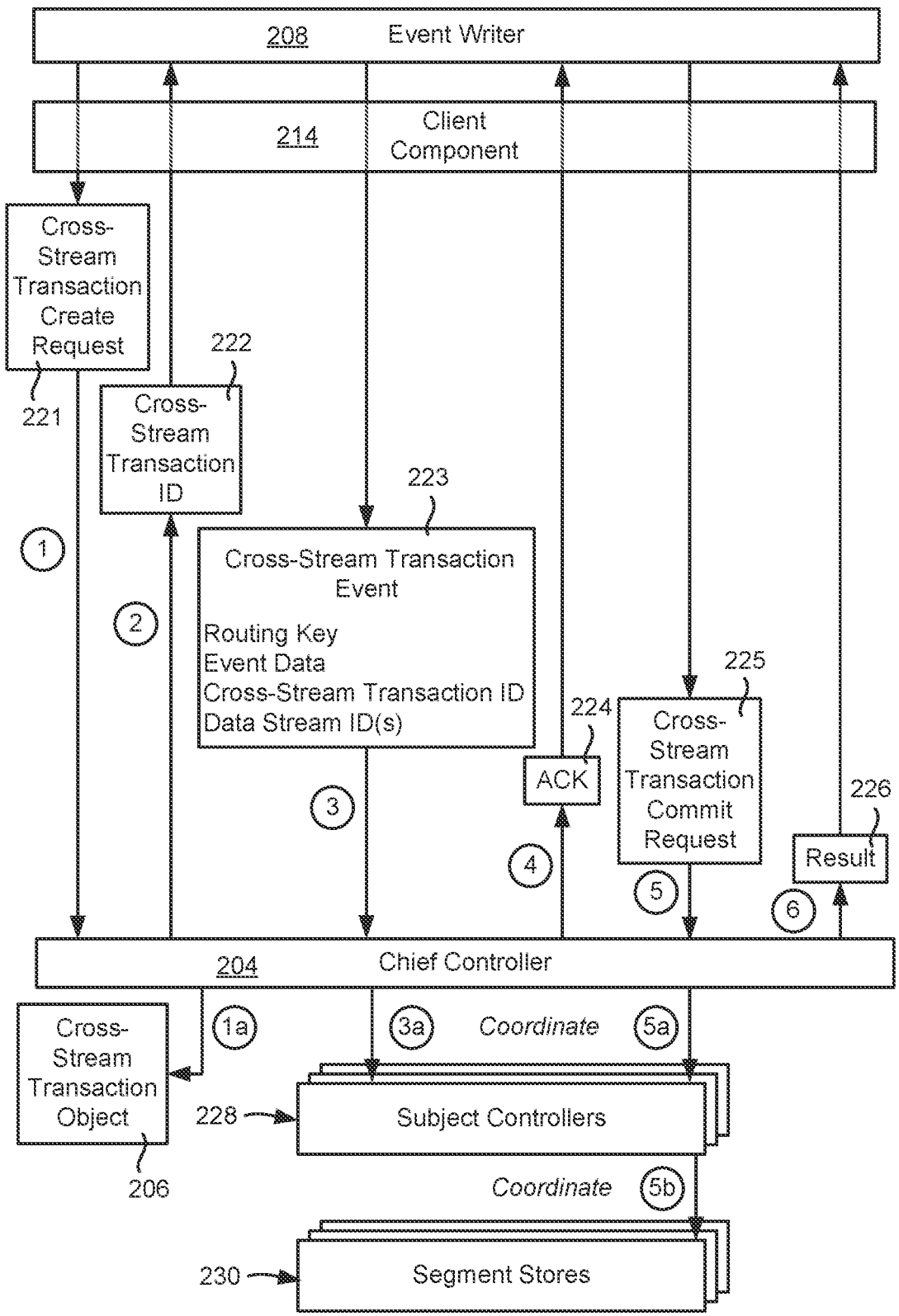
FIG. 2 is an example block diagram representation of components and data-related operations for a cross-stream transaction, in accordance with various aspects and implementations of the subject disclosure.

FIG. 2 shows additional details of an example cross-stream transaction. Unlike a normal transaction, one cross-stream transaction results in appends to two or more different data streams, where an append to one stream may be comprised of one or more events.

As represented in the example communications (blocks 221-226) of FIG. 2 to and from a client component 214, an event writer 208 can request (block 221, also represented by the arrow labeled 1) that the system create a cross-stream transaction. The controller of the system that receives the request becomes the chief controller 204 in this example, and creates a corresponding cross-stream transaction object 206 (arrow 1a); in one implementation this object is initially empty. A unique (at least unique within the system) cross-stream transaction identifier (ID) is assigned to the cross-stream transaction object, and returned (block 222, arrow 2) to the event writer 208.

The event writer 208 uses the cross-stream transaction ID to add an event (block 223) to the cross-stream transaction, as represented by the (arrow 3), with an ACK returned when received (block 224, arrow 4). In addition to the cross-stream transaction ID, event payload data and a standard set of one or more parameters (e.g., an event routing key) provided in the event 223, the event writer 208 also specifies one or multiple destination streams for the event. For example, an add (event, streams[ ]) call can be made in conjunction with a cross-stream transaction ID. The event writer can add any (practical) number of events to the cross-stream transaction corresponding to the object 206 via similar communications, until the writer commits the cross-stream transaction (or the cross-stream transaction gets aborted).

when an event specifies a data stream involved in the cross-stream transaction for the first time, a subordinate transaction (comprising a normal, single-stream level transaction) is created for the specified data stream via one of the subject controllers 228 (e.g., corresponding to the subject controllers 104(2)-104(*n*) of FIG. 1, or the chief controller 204 if specified for the data stream controlled by the chief controller 204. The IDs of the involved data streams can be added to the cross-stream transaction object 206 to track when a data stream is involved in a cross-stream transaction.

Figure 3:
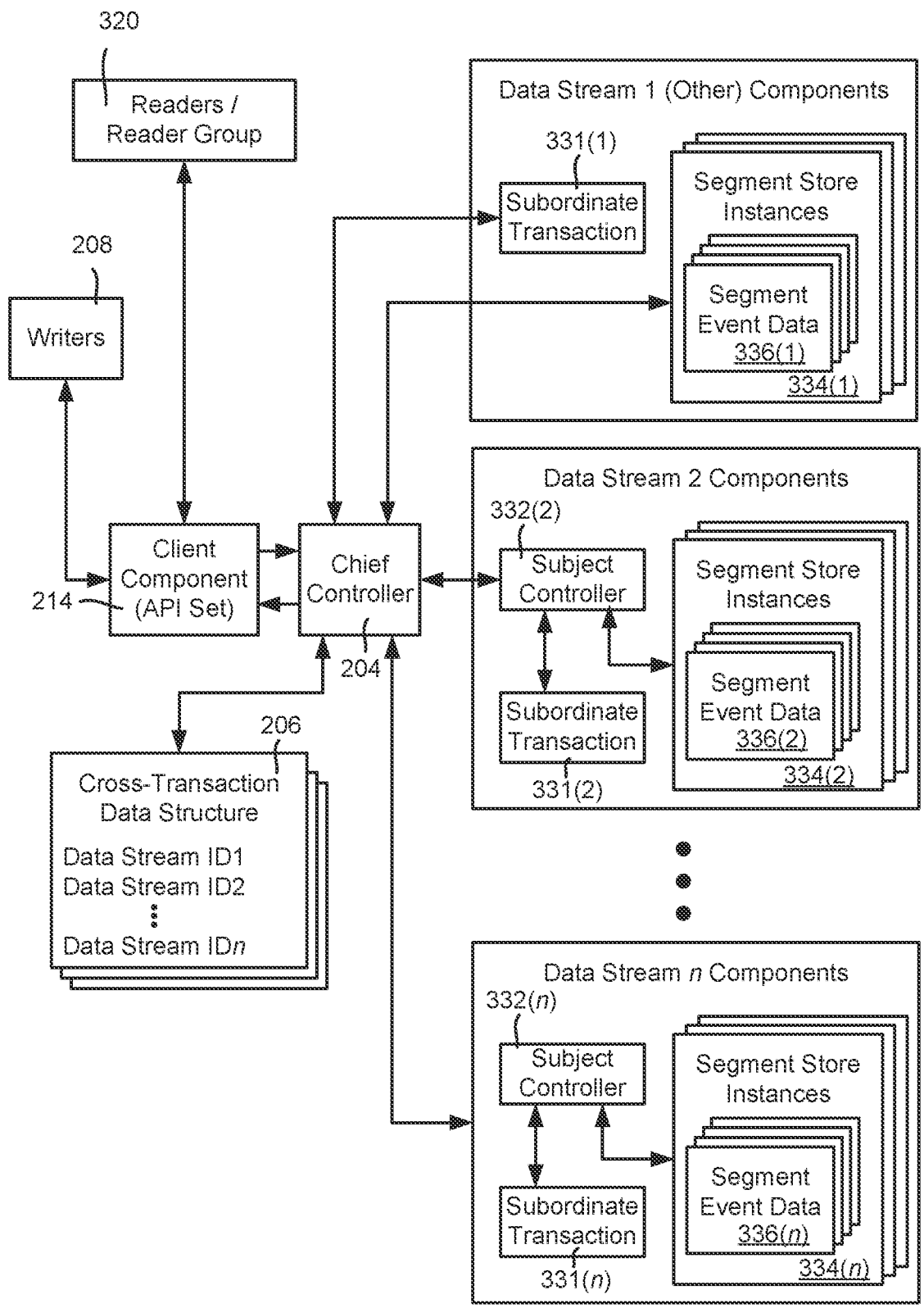
FIG. 3 is an example block diagram representation of data stream-related components for handling a cross-stream transaction, in accordance with various aspects and implementations of the subject disclosure.

This is generally represented in FIG. 3 via the data stream components 330(1)-330(*n*) and the subordinate transactions 331(1)-331 (*n*), respectively corresponding to the chief controller 204 and the (subject) controllers 332(2)-332(*n*). Note that these subordinate transactions 331(1)-331 (*n*) are system transactions, which are not exposed to any application, whereby no backdoor access to these subordinate transactions is possible. In this way, each new event gets added to the subordinate transaction that is associated with each specified data stream.

FIG. 3 further illustrates the client component 214 which provides a set of APIs to the system, a chief controller 204 which is a system coordinator, and segment store instances that each manages one or more segments. Note that in one implementation a segment store is stream-agnostic and manages individual segments; it is one of the controller's tasks to unite segments into streams.

In one implementation of a clustered environment, there are up to J controller instances and up to K segment store instances, where K is the number of nodes in the cluster. Each data stream is managed by one instance of the controller. Each stream segment is managed by one instance of the segment score; the segments of one data stream are supposed to be managed by different instances of the segment store. A subordinate transaction (e.g., which can be implemented as a normal single-stream transaction) is owned/managed by one of the instances of the controller.

For a cross-stream transaction, there is one instance of a controller that manages the cross-stream transaction, that is, the chief controller 204 as described herein. The instances of the controller that manage the subordinate transactions of the cross-stream transaction are referred to as subject controllers; (note that a chief controller and a subject controller are generally roles, or interfaces, and that in a general case, it is possible to have an instance of the controller that is a chief controller of a cross-stream transaction and a subject controller for a different cross-stream transaction at the same time). The various components are thus represented in FIG. 3, where the chief controller 204 and the subject controllers 332(2)-332(*n*) each control one or more segment store instances 334(1)-334(*n*), which in turn each manage one or more groups of segments 336(1)-336(*n*), respectively.

For a cross-stream transaction, in one or more implementations the chief controller 204 coordinates its subject controllers 332(2)-332(*n*) similar to how a controller coordinates the segment store instances for single-stream (normal) transaction. In this way, there is no need for new synchronization primitives. The subject controllers 332(2)-332(*n*) coordinate their instances of the segment store as usual; (as each segment belongs to exactly one stream, no conflicts are possible between subject controllers). Note that one instance of a segment store can manage multiple stream segments, including multiple stream segments involved in a cross-stream transaction; (this is true for normal transactions as well, whereby again there is no need for any new synchronization primitives).

In order to minimize data moves and synchronization over the network, in one or more implementations it can be beneficial to place normal stream transactions to the controller instances that manage the involved data streams. Further, it can be beneficial to place transaction segments to the segment store instances that manage the stream segments to which the transaction segments are to be appended. Notwithstanding, normal single-stream transactions need relatively complex synchronization between the controller and the segment store instances, and thus such normal single-stream transactions are not lightweight. As a result, cross-stream transactions are even more complex, and thus practical implementations can limit the maximal number of data streams involved in one cross-stream transaction (e.g. ten data streams).

Returning to FIG. 2, when the writer program 208 requests that the cross-stream transaction be committed (block 225, arrow 5), the subordinate (single stream) transactions are automatically committed by their respective controllers (collectively block 228) to their streams (arrow 5*a*). As is known, the subordinate (single stream) transactions are appended (arrow 5*b*) by their respective controllers to their appropriate segments based on each event's routing key (collectively block 230). A result 226 indicating success or failure is returned to the event writer (arrow 6).

Thus, in one implementation, committing a cross-stream transaction can be based on leveraging the existing synchronization logic of single stream (normal) transactions to coordinate committing of subordinate transactions. Note that a normal transaction coordinates committing of data to multiple stream segments, whereas a cross-stream transaction coordinates the committing of multiple normal transactions.

In case of a failure, via the chief controller and the subject controller(s), the cross-stream transaction aborts the subordinate transactions and aborts itself, so no new data is appended to any data stream. Note that failure can be a result of a writer application or other component failing, such as after a communication time-out period, for example; it is also feasible for a writer application to expressly fail/abort a cross-stream transaction at any time before committing the transaction.

Figure 4:
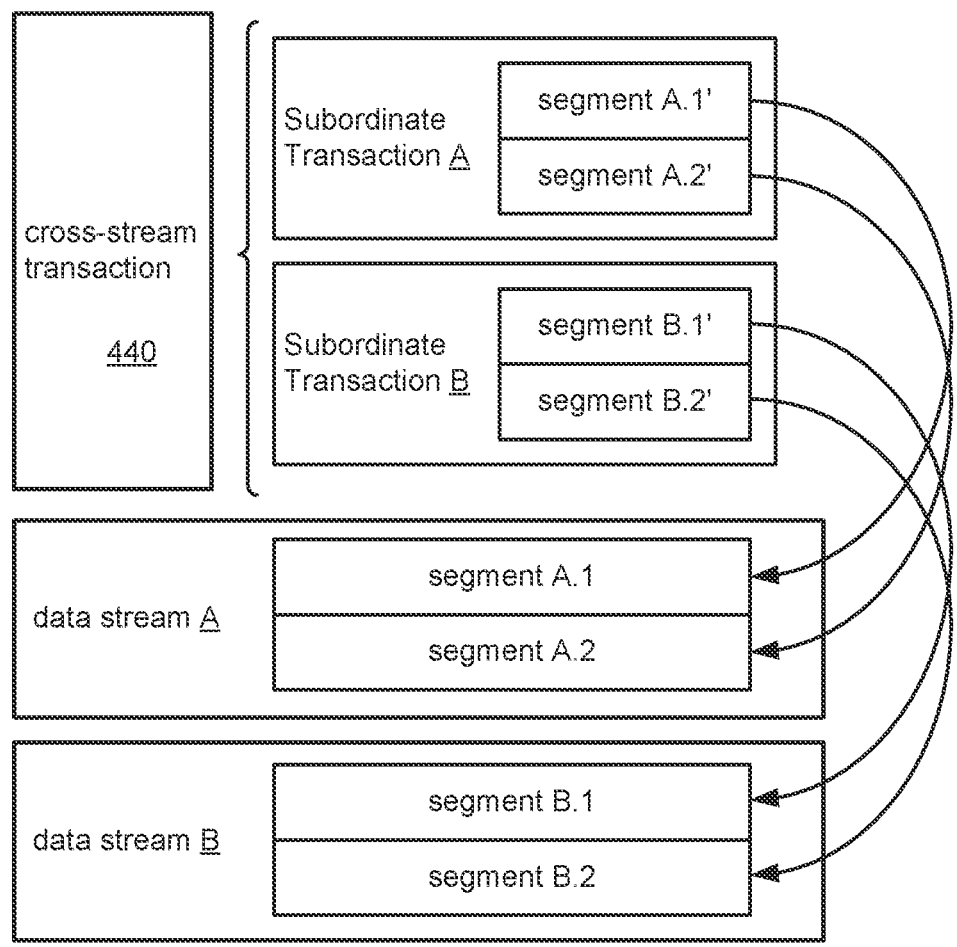
FIG. 4 is an example representation of committing a cross-stream transaction, in accordance with various aspects and implementations of the subject disclosure.

FIG. 4 depicts a cross-stream transaction 440 that involves two data streams A and B. As can be seen, the process of committing subordinate transaction A's event data, by appending A's event data to the segments A.1 and A.2 of the data stream A, is performed in conjunction with committing subordinate transaction B's event data, by appending B's event data to the segments B.1 and B.2 of the data stream B.

Figure 5:
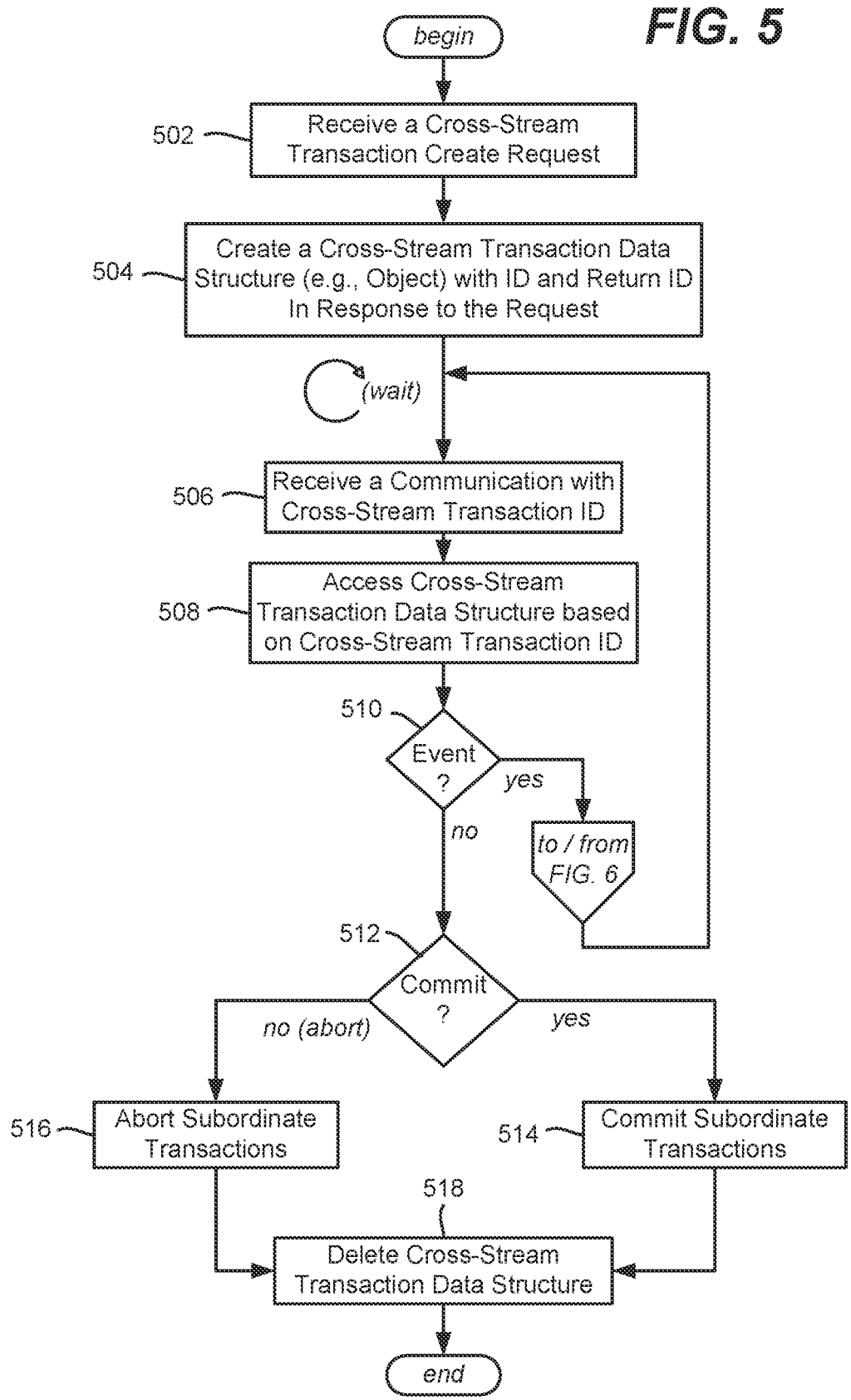
FIGS. 5 and 6 comprise a flow diagram showing example operations related to handling a cross-stream transaction, in accordance with various aspects and implementations of the subject disclosure.
Figure 6:
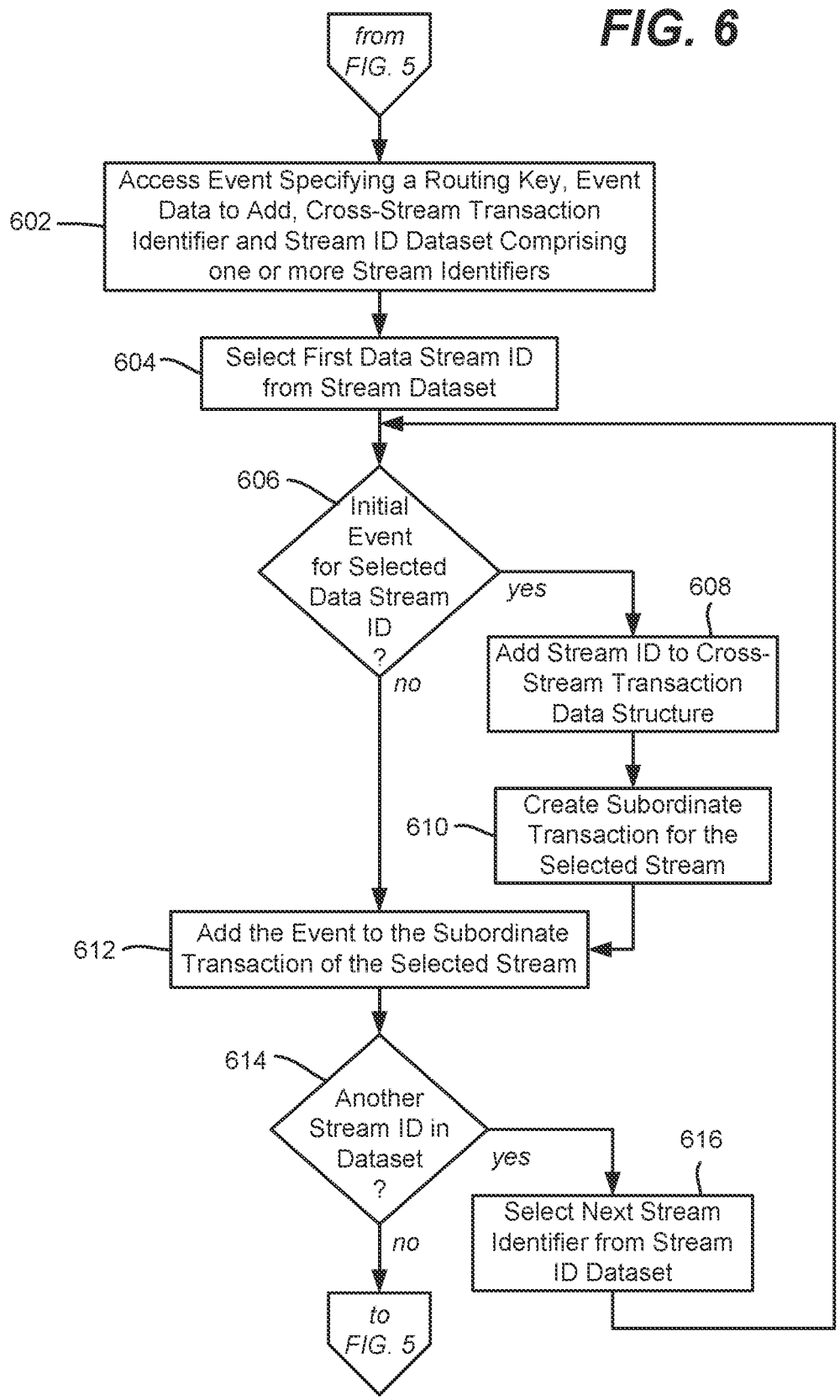

To summarize cross-stream transaction related operations, FIGS. 5 and 6 represent example operations related to a cross-stream transaction, beginning at operation 502 where a request to create the cross-stream transaction is received, e.g., by a (what becomes the chief) controller from a requesting writer application. Operation 504 represents the controller creating a cross-stream transaction data structure (e.g., object) along with a unique ID in response to the cross-stream transaction create request, and returning the cross-stream transaction ID to the requesting writer application.

Operation 506 represents receiving (e.g., after a wait) a subsequent communication associated (via the ID) with the cross-stream transaction. Operation 508 represents accessing the cross-stream transaction data structure having the corresponding ID; (note that a chief controller can manage more than one cross-stream transaction at a time). It is understood that although not explicitly shown in FIG. 5, a cross-stream transaction communication that specifies an invalid cross-stream transaction ID is rejected.

If the communication is an event as evaluated at operation 510, the process branches to operation 602 of FIG. 6. Operation 602 represents accessing the cross-stream transaction event's contents, (which can include evaluating the contents to ensure the cross-stream transaction event contains the proper data). The event content is coupled to or includes the cross-stream transaction ID, and the event content includes a routing key and the event payload data to add to the transaction, as well as a stream ID dataset comprising one or more data stream identifiers. It is understood that although not explicitly shown in FIG. 6, a cross-stream transaction event without the correct information (e.g., identifying at least one data stream) can be rejected.

In general, the chief controller performs operations for each stream identified in the stream ID dataset via operations 604, 614 and 616. More particularly, the chief controller selects the first stream ID from the event's stream ID dataset at operation 604, and at operation 606 determines (e.g., by evaluating data in the cross-stream transaction data structure) whether this is the first time an event has specified the data stream ID. If this is the initial cross-stream transaction event for a data stream, that is, the subordinate transaction for the selected data stream does not already exist, operation 608 adds the data stream ID to the cross-stream transaction data structure, and operation 610 creates a subordinate transaction for the selected data stream. For example, creating the subordinate transaction can be indirect, by instructing the subject controller that controls the specified data stream to create the transaction, or direct, by basically having the chief controller instruct itself (via create transaction code/logic therein) to create the subordinate transaction when the event specifies the chief controller's data stream.

Operation 612 adds part of the event's contents to the subordinate transaction of the selected data stream; note that this event data includes the routing key as well as the event data (payload) to be added, so that the corresponding subject controller (or chief controller if the event specifies the chief controller's data stream) can route the event payload data to the appropriate segment.

Operations 614 and 616 return to operation 606 to repeat the process for any other data stream identifier(s) in the event's contents, that is, if there was more than one data stream specified in this event's stream ID dataset. Note that at least some of these operations can be performed in parallel or substantially in parallel. When done, the process returns to operation 506 of FIG. 5 to await a further communication for this cross-stream transaction. As is understood, numerous cross-stream transaction events can be processed and added to their appropriate subordinate transactions.

When a cross-stream transaction communication is received at operation 508 that is not an event, in this example the communication is either a commit request or an abort request. Note that it is feasible to have other communications, such as a call to obtain a list of data streams involved so far, however such other possible communications are not described herein.

Operation 512 evaluates whether a commit request has been received for the cross-stream transaction identified at operation 506. If so, operation 514 commits the cross-stream transaction by committing the subordinate transactions. For example, committing a subordinate transaction can be indirect, by instructing the subject controller that controls a specified data stream to commit the subordinate transaction, or direct, by basically having the chief controller instruct itself (e.g., via commit code/logic therein) to commit the subordinate transaction that was created for the chief controller's data stream.

Otherwise the request is an abort request in this example, in which operation 518 aborts any subordinate transactions that have been created for this cross-stream transaction. Once the subordinate transactions have been committed or aborted, operation 518 deletes the cross-stream transaction, including deleting the cross-stream transaction data structure with its associated cross-stream transaction ID.

Turning to another aspect, namely cross-stream micro-transactions, instead of a two-level (controlling and subordinate levels) technology with complex synchronization, cross-stream transactions can be made more optimal for certain types of data writes. One such type of data write is the transactional writing of one event to multiple streams, which is one valuable, common way in which cross-stream transactions can be used. In this scenario, only one segment of each destination data stream is involved in any cross-stream transaction. Further, as will be understood, the lifetime of such a cross-stream transaction, when properly implemented, is almost zero. As a result of such a short lifetime, the system need not be concerned with potential changes that may happen at the level of individual destination streams, e.g., any kind of rebalancing. This is generally because the probability of such a change during the lifetime is close to zero, and any such change can be handled with a trivial and inexpensive retry operation.

Figure 7:
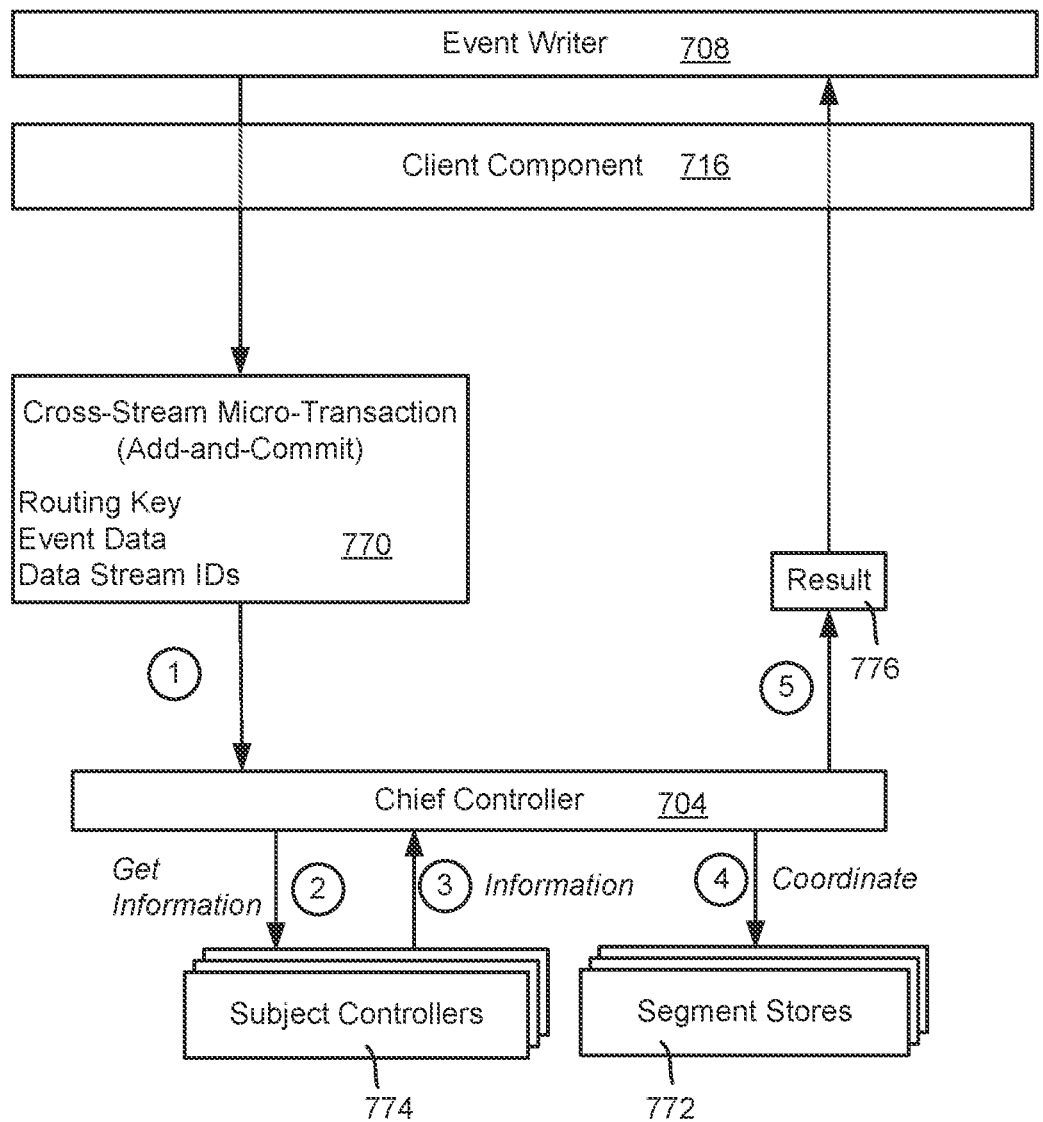
FIG. 7 is an example block diagram representation of components for handling a cross-stream micro-transaction, in accordance with various aspects and implementations of the subject disclosure.

As generally represented in FIG. 7, via cross-stream micro-transactions the technology described herein can avoid synchronization/coordination between different instances of the controller, (which is what otherwise causes cross-stream transactions to be two-level). By avoiding the need for such synchronization, a single-level cross-stream transaction, referred to herein as a cross-stream micro-transaction, can be used.

More particularly, a writer application explicitly requests, at a creation moment, a need for a cross-stream micro-transaction. In the case of Java API, a cross-stream micro-transaction is represented with a separate class.

For a cross-stream micro-transaction, in one implementation, instead of a sequence of add(event, streams[ ]) calls that ends with one commit( ) call, there can be one event to be multiplied. To this end, an addAndCommit(event, streams[ ]) call is sufficient, and is desirable as it makes the lifetime of a cross-stream micro-transaction as short as possible. An addAndCommit call adds the event to the specified streams and directly (virtually immediately thereafter) commits the cross-stream micro-transaction.

For a cross-stream micro-transaction, the specified event is directly appended by a single controller to the specified data streams' segments. To this end, as shown in FIG. 7, when a cross-stream micro-transaction (block 770, labeled arrow 1) is requested of a chief controller 704, the chief controller 704 obtains information of the segment stores (segment store instances, (collectively represented in FIG. 7 via block 772) by communicating (arrows 2 and 3) with the subject controllers (collectively represented in FIG. 7 via block 774) that control the specified data streams. Note that although "chief" and "subject" controllers are referred to herein for simplicity and consistency, with cross-stream micro-transactions there are (strictly speaking) no chief and subject controllers, as there is no main supervisor-subordinate relationship between controller instances.

More particularly, for each data stream specified in a cross-stream micro-transaction request, the chief controller 704 requests the subject controller that manages that data stream to return the destination stream segment for the event and the segment store instance that manages this stream segment. This information can be requested in parallel for the specified data streams.

Once the chief controller 704 has this information, an existing (already known) data stream storage system version of a multi-phase commit protocol can be used to append the event (arrow 4) to the identified stream segments via their segments stores, one segment for each destination stream, without further involvement of the subject controllers 228. A result 776 indicating success or failure is returned to the event writer (arrow 5). Note that one instance of a segment store may manage two or more identified stream segments; if so, the chief controller 704 makes a single request to the segment store instance, specifying the event and a list of the destination stream segments that the segment store instance manages.

Figure 8:
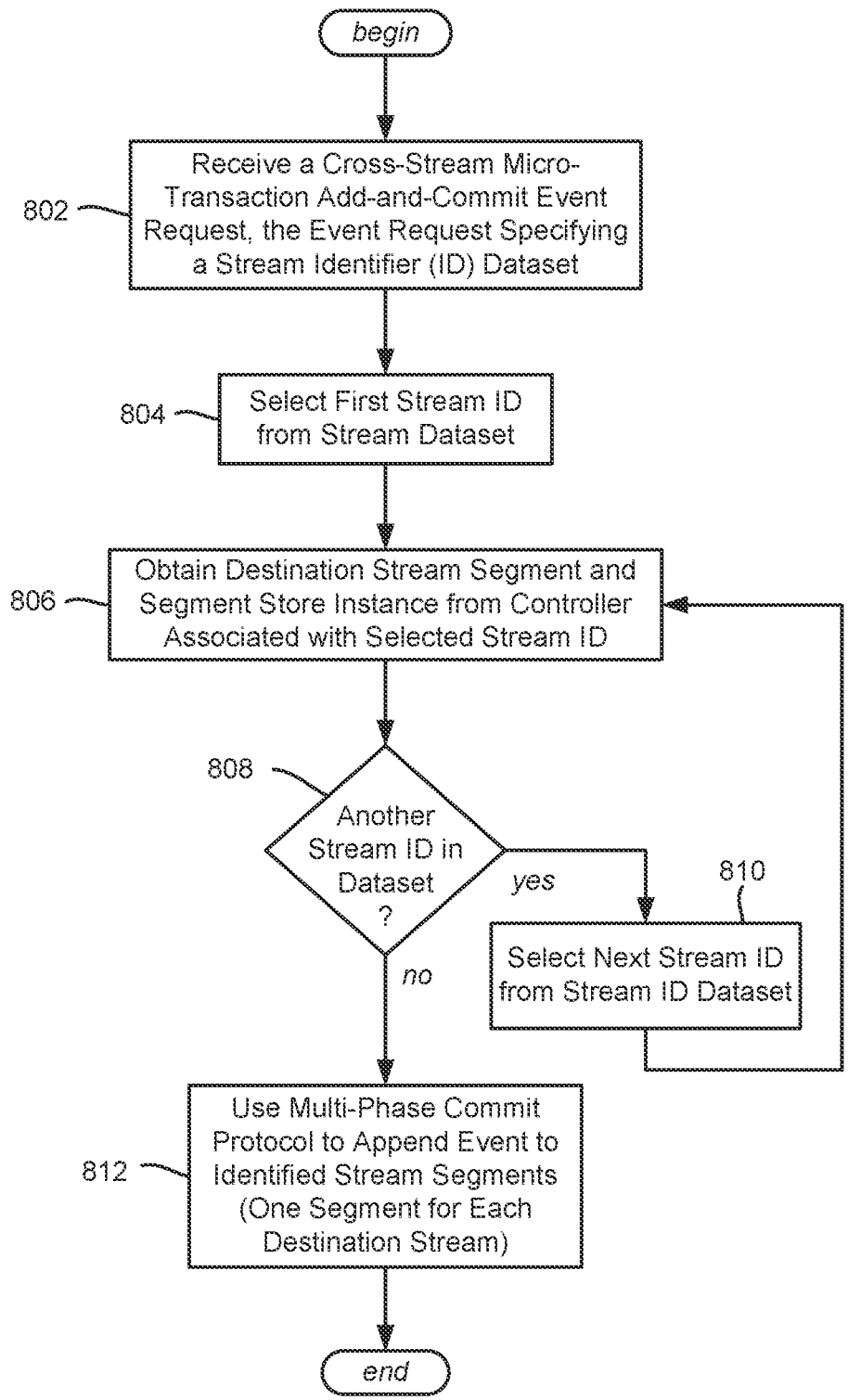
FIG. 8 is a flow diagram showing example operations related to handling a cross-stream micro-transaction, in accordance with various aspects and implementations of the subject disclosure.

FIG. 8 shows example operations of a cross-stream micro-transaction, beginning at operation 802 where a controller receives a cross-stream micro-transaction add-AndCommit event request that specifies a stream identifier (ID) dataset along with a routing key and the event payload. Via operation 804, the controller that received the request, which can be referred to as the chief controller, selects the first stream ID from the stream ID dataset.

Operation 806 represents obtaining the destination stream segment and segment store instance from the (subject) controller associated with selected stream ID. Operations 808 and 810 repeat the process for other stream IDs in the stream ID dataset; note that this can be in parallel or substantially in parallel, e.g., the controller does not have to wait for operation 806 to complete for one stream ID before requesting another subject controller to perform the same general get information task.

Once the destination stream segments and segment store instances from the subject controllers are obtained, operation 812 performs the append operations in a transaction. That is, the chief controller can use a multi-phase commit protocol to append the event payload to the identified stream segments (one segment for each destination data stream).

It should be noted that other cross-stream transaction use cases can be made more optimal. As one example, if multiple events with the same routing key are to be appended to multiple data stream segments in a cross-stream transaction, a modified micro-version of a cross-steam transaction can be used, e.g., an appendAndCommit [routing key, event1 payload, event2 payload . . . eventz payload, stream IDs] request can be used to transactionally append the multiple events' payloads to appropriate segments of the specified data streams in a single call.

Because a cross-stream micro-transaction has only a single controller coordination level, a cross-stream micro-transaction operates somewhat similar to a normal transaction. However, a cross-stream micro-transaction is actually less expensive in resource usage, as a cross-stream micro-transaction only implies multiple requests for information, whereas a normal transaction implies manipulations with multiple transaction segments, which are more resource-demanding operations.

Figure 9:
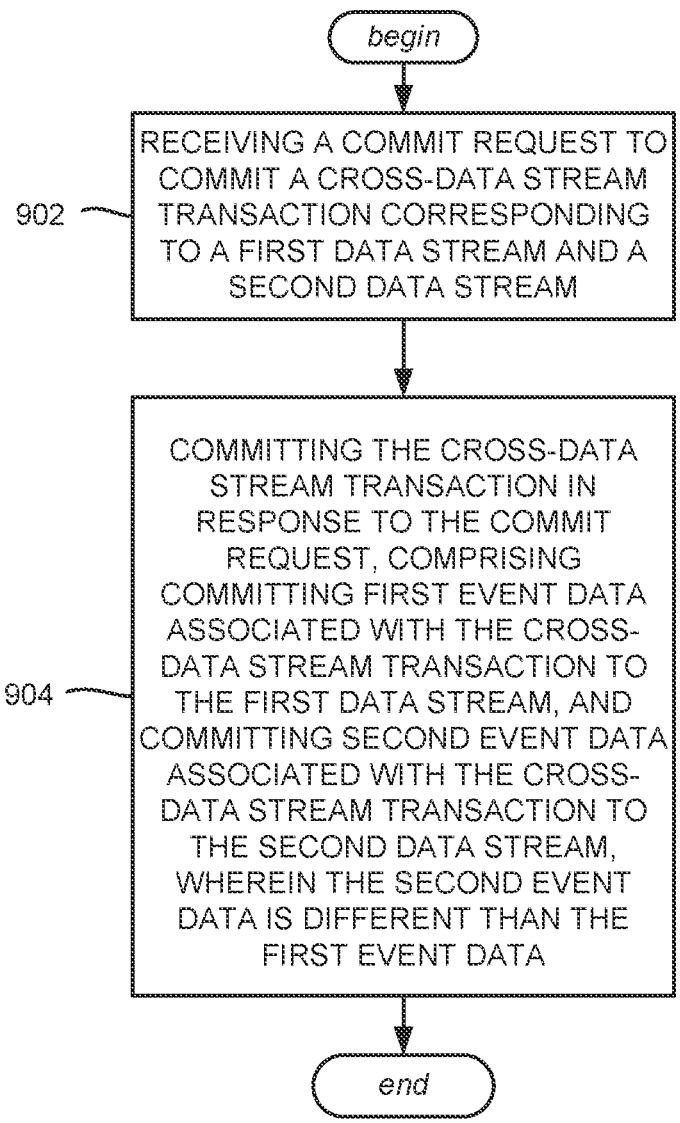
FIG. 9 is a flow diagram showing example operations related to committing a cross-stream transaction, in accordance with various aspects and implementations of the subject disclosure.

One or more aspects can be embodied in a system, such as represented in FIG. 9, and for example can comprise a memory that stores computer executable components and/or operations, and a processor that executes computer executable components and/or operations stored in the memory. Example operations can comprise operation 902, which represents receiving a commit request to commit a cross-data stream transaction corresponding to a first data stream and a second data stream. Operation 904 represents committing the cross-data stream transaction in response to the commit request, comprising committing first event data associated with the cross-data stream transaction to the first data stream, and committing second event data associated with the cross-data stream transaction to the second data stream, wherein the second event data is different than the first event data.

The commit request can comprise a cross-data stream micro-transaction request associated with a first identifier of the first data stream, a second identifier of the second data stream and common event data comprising the first event data and the second event data. Further operations can comprise communicating with a first controller associated with the first data stream to determine a first destination segment and a first segment store usable to append the first event data, and communicating with a second controller associated with the second data stream to determine a second destination segment and a second segment store usable to append the second event data.

Further operations can comprise adding the first event data to a first subordinate transaction of the first data stream that is subordinate to the cross-data stream transaction, adding the second event data to a second subordinate transaction of the second data stream, and wherein the committing the cross-data stream transaction comprises committing the first subordinate transaction to append the first event data to the first data stream, and committing the second subordinate transaction to append the second event data to the second data stream.

Further operations can comprise receiving a request corresponding to creating the cross-data stream transaction, and, in response to the request, creating the cross-data stream transaction comprising creating a cross-data stream transaction data structure comprising a cross-data stream transaction identifier, and returning the cross-data stream transaction identifier.

Further operations can comprise receiving the first event data in association with the cross-data stream transaction identifier and in association with a data stream identifier dataset comprising the first identifier of the first data stream.

Further operations can comprise receiving the first event data in association with the cross-data stream transaction identifier and in association with a data stream identifier dataset comprising the first identifier of the first data stream and a third identifier of a third data stream.

Further operations can comprise creating the first subordinate transaction of the first data stream. Creating the first subordinate transaction of the first data stream can comprise receiving the first event data, and, in response to receiving the first event data, determining that the first subordinate transaction does not already exist.

Figure 10:
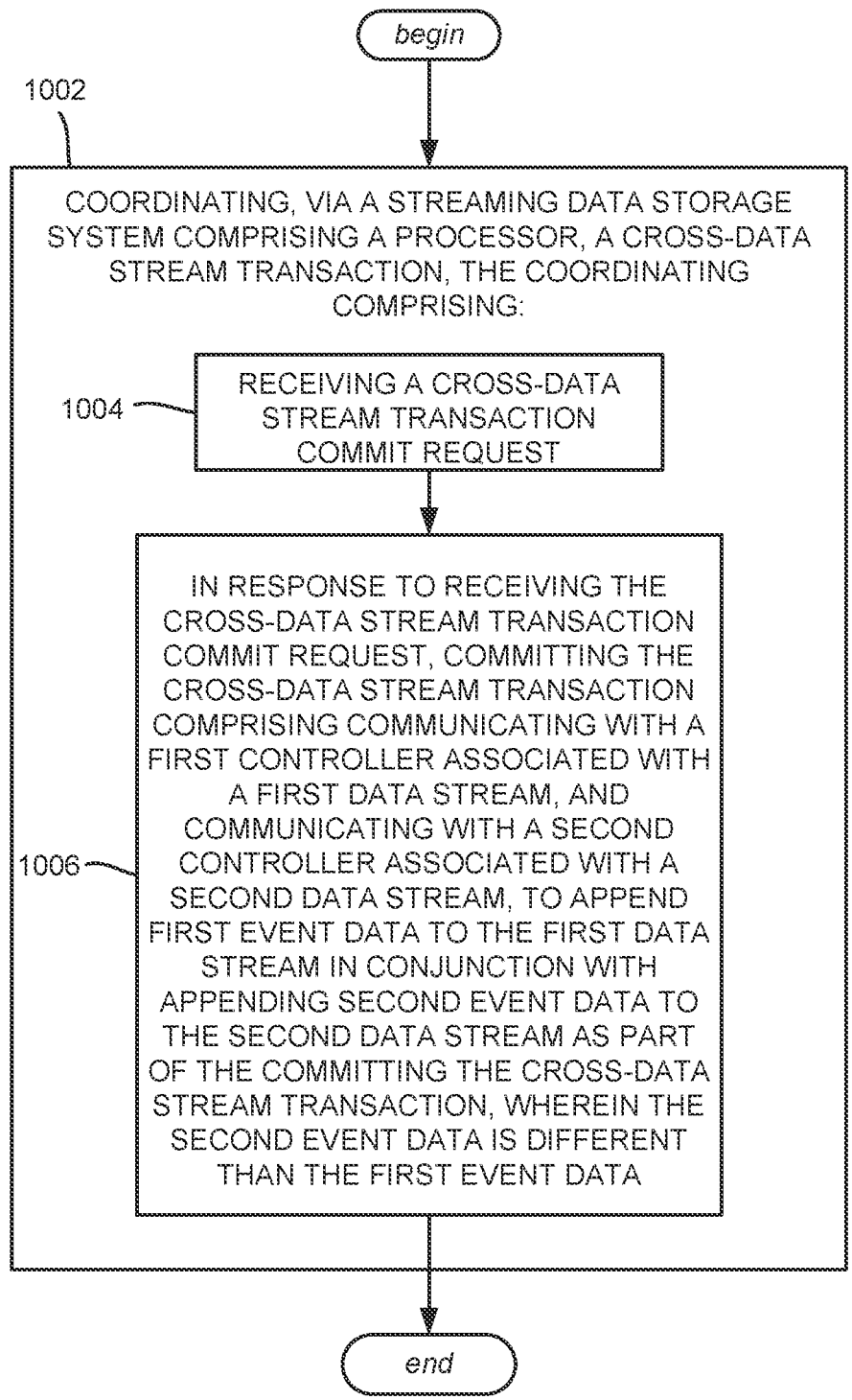
FIG. 10 is a flow diagram showing example operations related to coordinating the committing of a cross-stream transaction, in accordance with various aspects and implementations of the subject disclosure.

One or more example aspects, such as corresponding to example operations of a method, are represented in FIG. 10. Operation 1002 represents coordinating, via a streaming data storage system comprising a processor, a cross-data stream transaction. The coordinating can comprise receiving a cross-data stream transaction commit request (operation 1004), and in response to receiving the cross-data stream transaction commit request, committing the cross-data stream transaction comprising communicating with a first controller associated with a first data stream, and communicating with a second controller associated with a second data stream, to append first event data to the first data stream in conjunction with appending second event data to the second data stream as part of the committing the cross-data stream transaction, wherein the second event data is different than the first event data (operation 1006).

Operations can further comprise receiving a request to create the cross-data stream transaction, and, in response to the request, creating the cross-data stream transaction comprising creating a cross-data stream transaction data structure having a cross-data stream transaction identifier, and returning the cross-data stream transaction identifier.

The first controller of the first data stream can manage a first subordinate transaction to which the first event data is added, the first subordinate transaction being subordinate to the cross-data stream transaction, the second controller of the second data stream can manage a second subordinate transaction to which the second event data is added, the second subordinate transaction being subordinate to the cross-data stream transaction, and committing the cross-data stream transaction can further comprise instructing the first controller to commit the first subordinate transaction and instructing the first controller to commit the second subordinate transaction.

Operations can further comprise instructing the first controller to create the first subordinate transaction and instructing the second controller to create the second subordinate transaction.

Operations can further comprise receiving the first event data in association with an identifier of the first data stream, and, in response to receiving the first event data, adding the first event data to the first subordinate transaction.

Operations can further comprise, in response to receiving the first event data, determining whether the first subordinate transaction already exists, and, in response to determining that the first subordinate transaction does not already exist, instructing the first controller to create the first subordinate transaction.

The first event data and the second event data can be common event data, and receiving the cross-data stream transaction commit request can comprise receiving a cross-data stream micro-transaction request associated with a first identifier of the first data stream and a second identifier of the second data stream. Further operations can comprise communicating with the first controller to determine a first destination segment and a first segment store to append the common event data as the first event data, and communicating with the second controller to determine a second destination segment and a second segment store to append the common event data as the second event data.

Figure 11:
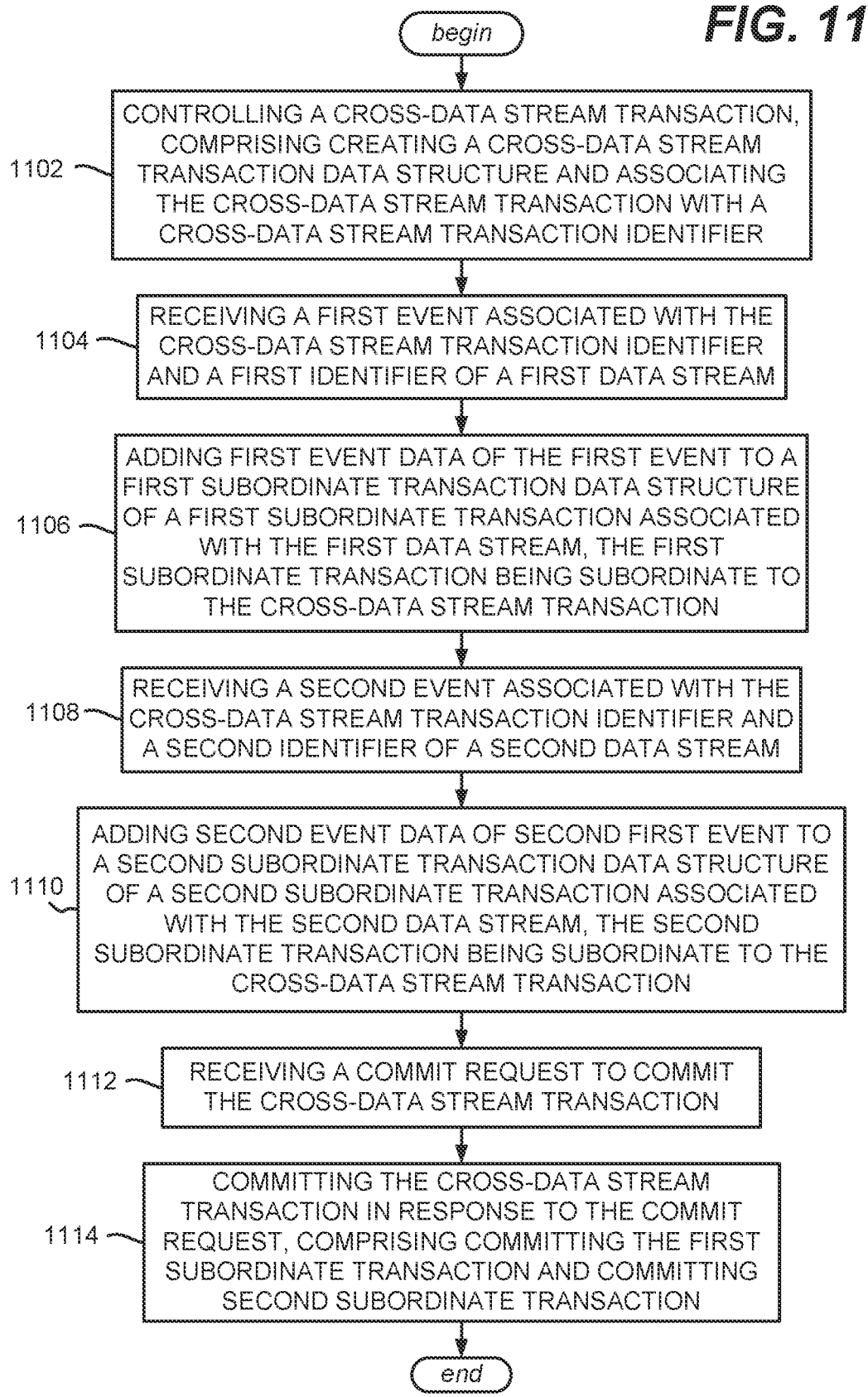
FIG. 11 is a flow diagram showing example operations related to coordinating a cross-stream transaction, including creating subordinate transactions and committing the cross-stream transaction by committing the subordinate transactions, in accordance with various aspects and implementations of the subject disclosure.

FIG. 11 summarizes various example operations, e.g., corresponding to a machine-readable storage medium, comprising executable instructions that, when executed by a processor of a streaming data storage system, facilitate performance of operations. Operation 1102 represents controlling a cross-data stream transaction, comprising creating a cross-data stream transaction data structure and associating the cross-data stream transaction with a cross-data stream transaction identifier. Operation 1104 represents receiving a first event associated with the cross-data stream transaction identifier and a first identifier of a first data stream. Operation 1106 represents adding first event data of the first event to a first subordinate transaction data structure of a first subordinate transaction associated with the first data stream, the first subordinate transaction being subordinate to the cross-data stream transaction. Operation 1108 represents receiving a second event associated with the cross-data stream transaction identifier and a second identifier of a second data stream. Operation 1110 represents adding second event data of second first event to a second subordinate transaction data structure of a second subordinate transaction associated with the second data stream, the second subordinate transaction being subordinate to the cross-data stream transaction. Operation 1112 represents receiving a commit request to commit the cross-data stream transaction. Operation 1114 represents committing the cross-data stream transaction in response to the commit request, comprising committing the first subordinate transaction and committing second subordinate transaction.

Further operations can comprise instructing a first controller of the first data stream to create the first subordinate transaction, and instructing a second controller of the second data stream to create the second subordinate transaction.

Further operations can comprise receiving a third event associated with the cross-data stream transaction identifier and a third identifier of a third data stream, and adding third event data of the third event to a third subordinate transaction data structure of the third subordinate transaction.

As can be seen, described herein is a technology that facilitates cross-stream transactions that support advanced stream processing logic. The technology is highly efficient and practical to implement, leveraging existing single-stream transaction technology, or using cross-stream micro-transactions to support a specific use-case in which one event needs to be appended to a set of streams.

Figure 12:
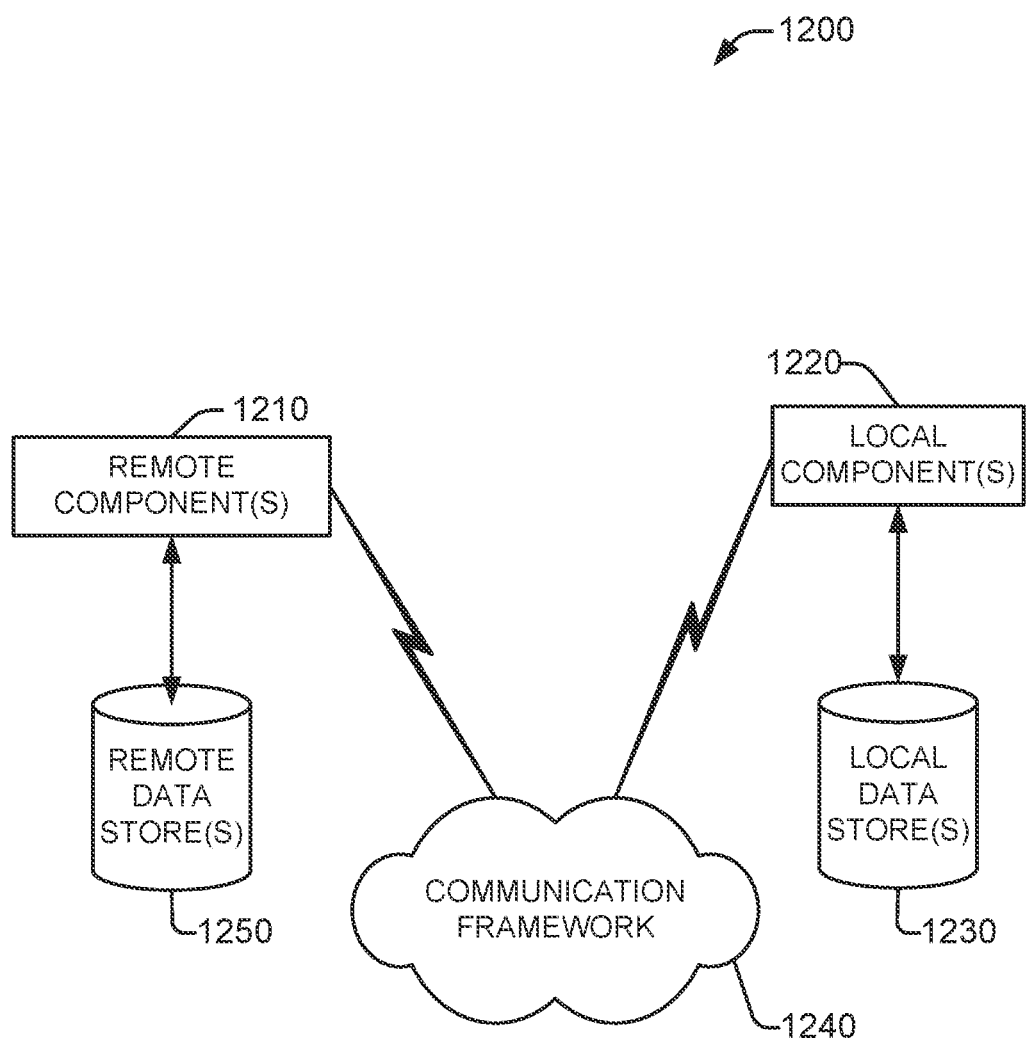
FIG. 12 is a block diagram representing an example computing environment into which aspects of the subject matter described herein may be incorporated.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
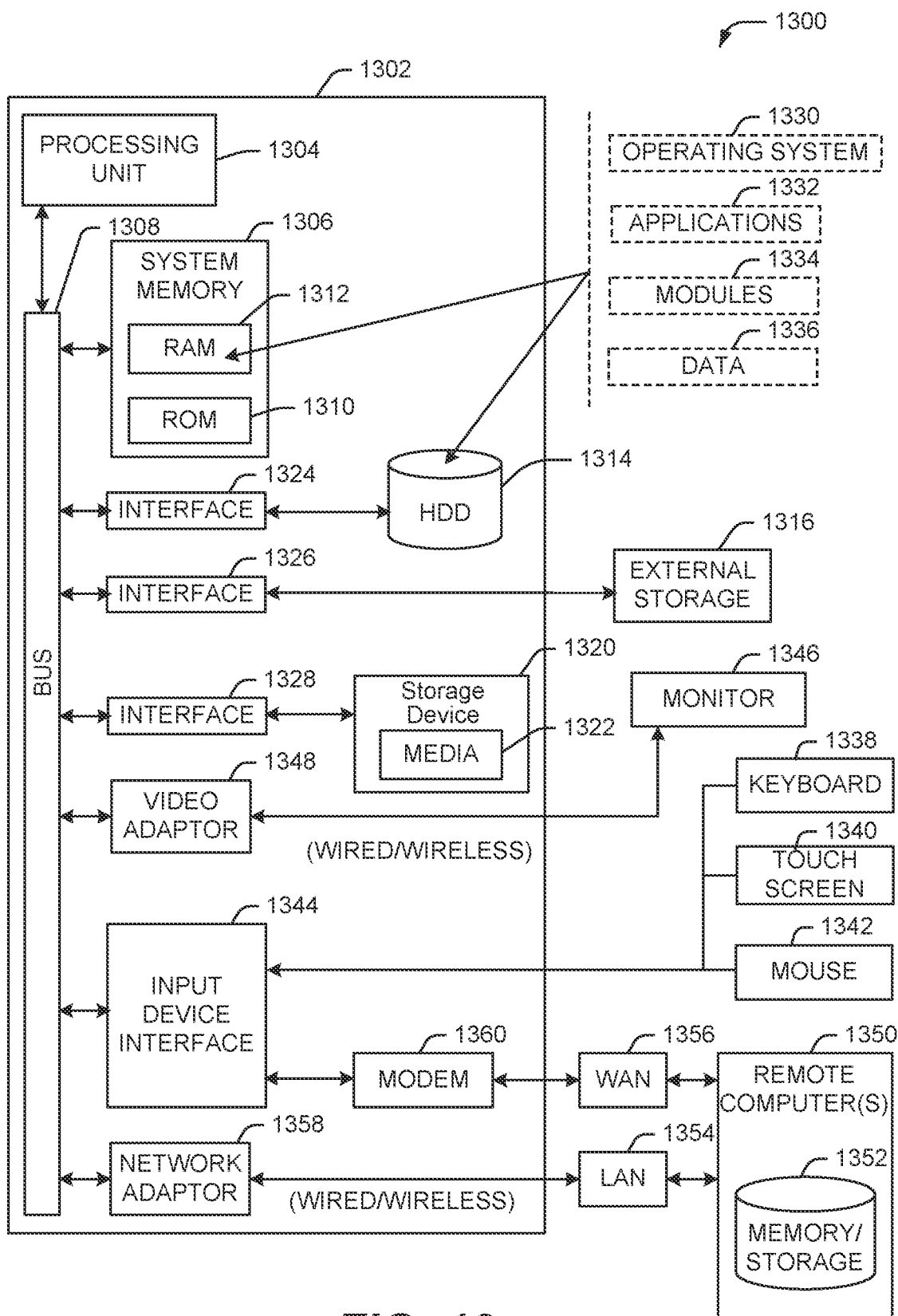
FIG. 13 depicts an example schematic block diagram of a computing environment with which the disclosed subject matter can interact/be implemented at least in part, in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
receiving a commit request to commit a cross-data stream transaction corresponding to a first data stream and a second data stream;
adding the first event data to a first subordinate transaction of the first data stream that is subordinate to the cross-data stream transaction;
adding the second event data to a second subordinate transaction of the second data stream;
committing the first subordinate transaction resulting in appending the first event data to the first data stream; and
committing the second subordinate transaction resulting in appending the second event data to the second data stream, wherein the second event data is different than the first event data.

2. The system of claim 1, wherein the commit request comprises a cross-data stream micro-transaction request associated with a first identifier of the first data stream, a second identifier of the second data stream and common event data comprising the first event data and the second event data.

3. The system of claim 2, wherein the operations further comprise communicating with a first controller associated with the first data stream to determine a first destination segment and a first segment store usable to append the first event data, and communicating with a second controller associated with the second data stream to determine a second destination segment and a second segment store usable to append the second event data.

4. The system of claim 1, wherein the operations further comprise receiving a request corresponding to creating the cross-data stream transaction, and, in response to the request, creating the cross-data stream transaction comprising creating a cross-data stream transaction data structure comprising a cross-data stream transaction identifier, and returning the cross-data stream transaction identifier.

5. The system of claim 1, wherein the operations further comprise receiving the first event data in association with the cross-data stream transaction identifier and in association with a data stream identifier dataset comprising the first identifier of the first data stream.

6. The system of claim 1, wherein the operations further comprise receiving the first event data in association with the cross-data stream transaction identifier and in association with a data stream identifier dataset comprising the first identifier of the first data stream and a third identifier of a third data stream.

7. The system of claim 1, wherein the operations further comprise creating the first subordinate transaction of the first data stream.

8. The system of claim 7, wherein the creating the first subordinate transaction of the first data stream comprises receiving the first event data, and, in response to receiving the first event data, determining that the first subordinate transaction does not already exist.

9. A method, comprising:
coordinating, via a streaming data storage system comprising a processor, a cross-data stream transaction, the coordinating comprising:
receiving a cross-data stream transaction commit request, and
in response to receiving the cross-data stream transaction commit request, committing the cross-data stream transaction comprising communicating with a first controller associated with a first data stream, and communicating with a second controller associated with a second data stream, wherein the first controller of the first data stream manages a first subordinate transaction to which first event data is added, the first subordinate transaction being subordinate to the cross-data stream transaction, wherein the second controller of a second data stream manages a second subordinate transaction to which second event data is added, the second subordinate transaction being subordinate to the cross-data stream transaction, wherein the committing the cross-data stream transaction comprises instructing the first controller to commit the first subordinate transaction and instructing the first controller to commit the second subordinate transaction resulting in appending first event data to the first data stream in conjunction with appending second event data to the second data stream as part of the committing the cross-data stream transaction, and wherein the second event data is different than the first event data.

10. The method of claim 9, further comprising receiving a request to create the cross-data stream transaction, and, in response to the request, creating the cross-data stream transaction comprising creating a cross-data stream transaction data structure having a cross-data stream transaction identifier, and returning the cross-data stream transaction identifier.

11. The method of claim 9, further comprising instructing the first controller to create the first subordinate transaction and instructing the second controller to create the second subordinate transaction.

12. The method of claim 11, further comprising receiving the first event data in association with an identifier of the first data stream, and, in response to receiving the first event data, adding the first event data to the first subordinate transaction.

13. The method of claim 9, further comprising, in response to receiving the first event data, determining whether the first subordinate transaction already exists, and, in response to determining that the first subordinate transaction does not already exist, instructing the first controller to create the first subordinate transaction.

14. The method of claim 9, wherein the first event data and the second event data are common event data, and wherein the receiving the cross-data stream transaction commit request comprises receiving a cross-data stream micro-transaction request associated with a first identifier of the first data stream and a second identifier of the second data stream.

15. The method of claim 14, further comprising communicating with the first controller to determine a first destination segment and a first segment store to append the common event data as the first event data, and communicating with the second controller to determine a second destination segment and a second segment store to append the common event data as the second event data.

16. A non-transitory machine-readable medium, comprising executable instructions that, when executed by a processor of a streaming data storage system, facilitate performance of operations, the operations comprising:
controlling a cross-data stream transaction, comprising creating a cross-data stream transaction data structure and associating the cross-data stream transaction with a cross-data stream transaction identifier;
receiving a first event associated with the cross-data stream transaction identifier and a first identifier of a first data stream;
adding first event data of the first event to a first subordinate transaction data structure of a first subordinate transaction associated with the first data stream, the first subordinate transaction being subordinate to the cross-data stream transaction;
receiving a second event associated with the cross-data stream transaction identifier and a second identifier of a second data stream;
adding second event data of second first event to a second subordinate transaction data structure of a second subordinate transaction associated with the second data stream, the second subordinate transaction being subordinate to the cross-data stream transaction;
receiving a commit request to commit the cross-data stream transaction; and
committing the cross-data stream transaction in response to the commit request, comprising committing the first subordinate transaction and committing second subordinate transaction.

17. The non-transitory machine-readable medium of claim 16, wherein the operations further comprise instructing a first controller of the first data stream to create the first subordinate transaction, and instructing a second controller of the second data stream to create the second subordinate transaction.

18. The non-transitory machine-readable medium of claim 16, wherein the operations further comprise receiving a third event associated with the cross-data stream transaction identifier and a third identifier of a third data stream, and adding third event data of the third event to a third subordinate transaction data structure of the third subordinate transaction.

19. The non-transitory machine-readable medium of claim 16, wherein the operations further comprise, in response to receiving the first event data, determining whether the first subordinate transaction already exists, and, in response to determining that the first subordinate transaction does not already exist, instructing the first controller to create the first subordinate transaction.

20. The non-transitory machine-readable medium of claim 16, wherein the first event data and the second event data are common event data, and wherein the receiving the cross-data stream transaction commit request comprises receiving a cross-data stream micro-transaction request associated with a first identifier of the first data stream and a second identifier of the second data stream.

* * * * *